(12) United States Patent
Lanvers

(10) Patent No.: US 6,402,494 B1
(45) Date of Patent: Jun. 11, 2002

(54) APPARATUS FOR PRODUCING A TOOTHBRUSH

(75) Inventor: Andreas Lanvers, Bad Honnef (DE)

(73) Assignee: M + C SChiffer GmbH, Neustaft/Weid (DE)

( * ) Notice: Subject to any disclaimer, the term of this patent is extended or adjusted under 35 U.S.C. 154(b) by 0 days.

(21) Appl. No.: 09/538,987

(22) Filed: Mar. 30, 2000

Related U.S. Application Data

(63) Continuation of application No. PCT/EP97/05952, filed on Oct. 28, 1997.

(30) Foreign Application Priority Data

Oct. 1, 1997 (DE) .......................................... 197 43 556

(51) Int. Cl.⁷ .............................................. B29C 45/16
(52) U.S. Cl. ................. 425/116; 264/328.7; 264/328.8; 425/127; 425/129.1; 425/577
(58) Field of Search ................. 425/116, 127, 425/129.1, 577; 264/328.7, 328.8

(56) References Cited

U.S. PATENT DOCUMENTS 2,317,110 A    4/1943  Person 4,990,077 A  * 2/1991  Morita ........................ 425/130
5,609,890 A  * 3/1997  Boucherie ................... 425/130

FOREIGN PATENT DOCUMENTS

DE    35 12 192 A1    10/1986
DE    43 11 186 A1    10/1994

OTHER PUBLICATIONS

Patent Abstracts of Japan, vol.8, No. 158 (M–311), Jul. 21 1984; Pubication No. JP 59 052632A dated Mar. 27 1984; Applicant—Showa Kasei; Inventor—Yokoyama Shojiro.

* cited by examiner

*Primary Examiner*—Tim Heitbrink
(74) *Attorney, Agent, or Firm*—Lawrence E. Laubscher, Sr.

(57) ABSTRACT

The present invention relates to a method and an apparatus for producing a toothbrush comprising a handle and a brush head provided with a plurality of bristle bundles. A basic body of a brush head is produced preferably from a hard component in an injection-moulding means, the bristle bundles being embedded at their ends in bristle-bundle holding sections which are connected by bridge portions. These bridge portions are cut through and the basic body of the brush head is encompassed preferably with a soft component by injection moulding.

10 Claims, 2 Drawing Sheets

Figures 2A, 2B, 2C:
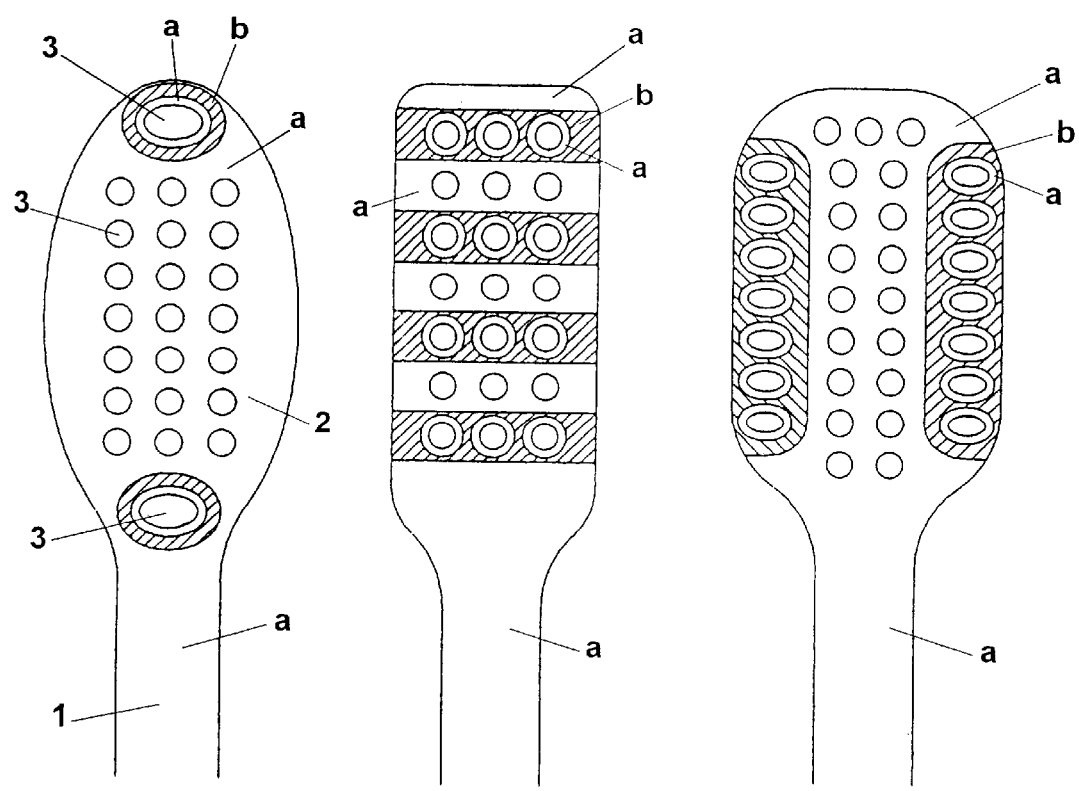

Fig. 1A
Fig. 1B
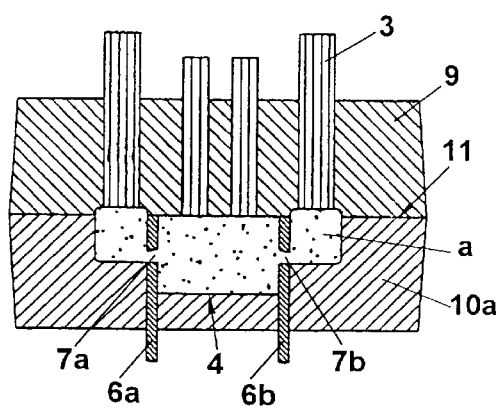
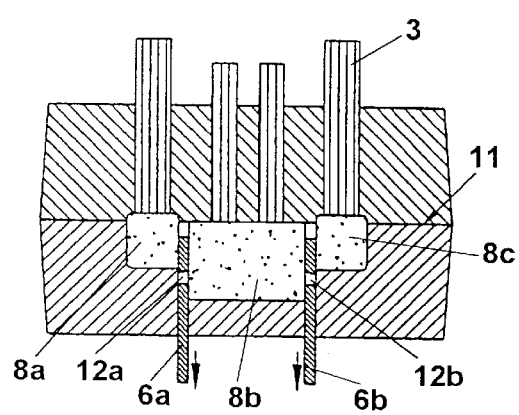
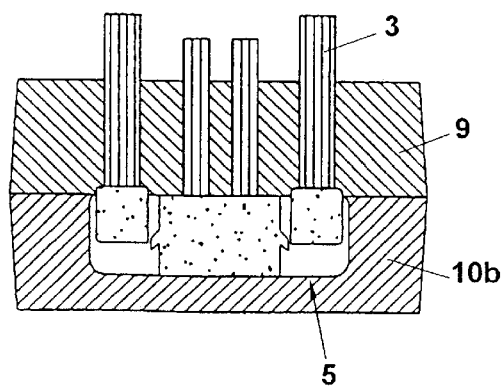
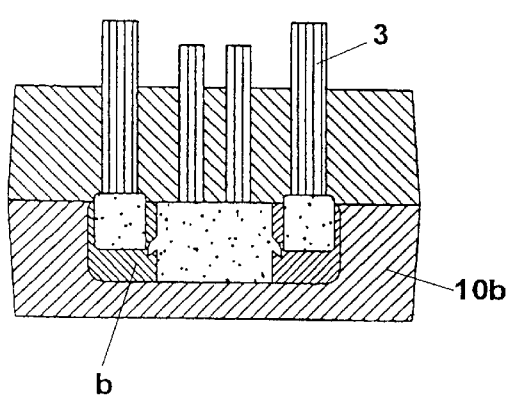
Fig. 1C
Fig. 1D

APPARATUS FOR PRODUCING A TOOTHBRUSH

REFERENCE TO RELATED APPLICATION

This application is a continuation of PCT application No. PCT/EP97/05952, filed Oct. 28, 1997.

BACKGROUND OF THE PRIOR ART

1. Field of the Invention

The present invention relates to a method and an apparatus for producing a toothbrush comprising a handle, a brush head and a plurality of bristle bundles, at least said brush head consisting partly of a first and partly of a second component.

2. Brief Description of the Prior Art

In the production of toothbrushes, it is known to produce the brush head from a hard component by injection moulding, said brush head being provided with blind holes into which the bristle bundles are pressed with the aid of the so-called anchor method. Furthermore, the so-called anchorless method is known in the field of toothbrush production; in the case of this method, the bristle bundles are encompassed with a hard-elastic plastic material by injection moulding. The hard-elastic plastic material has the effect that the bristle bundles cannot easily be drawn out of the brush head. In addition, the hard-elastic component essentially determines the elastic behaviour of the brush head. In the case of toothbrushes it is, however, desirable that the brush head has bristle sections of a comparatively low relative stiffness and bristle sections of a comparatively high relative stiffness. This aim could be achieved by using bristle bundles having different degrees of stiffness. The use of different bristles on a toothbrush, however, means that the production expenditure will be increased substantially.

SUMMARY OF THE INVENTION

It is therefore the object of the present invention to provide a method of producing a toothbrush of the type mentioned at the start in the case of which the brush head and/or the bristle bundles accommodated therein have improved elastic or stiffness properties and which allows a wide variety of different brush head designs. It is a further object of the present invention to provide an injection-moulding means for producing a toothbrush of the type mentioned at the start by means of which a toothbrush can be produced at a reasonable price, allowing the brush head of said toothbrush and/or the bristle bundles accommodated therein to have improved elastic or stiffness properties, and to allow a very variable design of the brush head and bristle accommodating structures.

The first-mentioned object is achieved by a method of producing a toothbrush comprising a handle and a brush head, which is provided with a plurality of bristle bundles, at least said brush head consisting of at least first and second components, comprising the following method steps: injection moulding a basic body of a brush head from a first component in a first mould cavity, the bristle bundles being embedded at their ends into at least one bristle-bundle holding section consisting of said first component and said bristle-bundle holding section being connected by at least one bridge portion with the other areas consisting of said first component, cutting off the bridge portion between the bristle-bundle holding section and the other sections, changing the mould cavity, the second mould cavity being larger than the first mould cavity in the area of the bristle-bundle holding sections, and encompassing the bristle-bundle holding sections, which consist of said first component with a second component by means of injection moulding.

Preferably, the first component is a hard component while the second component is a soft component.

The second object mentioned is achieved by an injection-moulding means for producing a toothbrush, comprising an upper mould component and a first lower mould component defining together a first mould cavity for injection moulding a basic body of a brush head, wherein at least one movable mandrel is provided in said first mould cavity, said mandrel comprising first means causing the formation of at least one bridge portion between injection-moulded bristle-bundle holding sections during the injection-moulding process, and that the mandrel comprises second means which will cut off the bridge portion when said mandrel is moved in a predetermined manner.

Preferred embodiments are laid down in the dependent claims.

In the following, the present invention will be explained in detail on the basis of embodiments in connection with the associated drawings, in which:

FIGS. 1A–D show the fundamental structural design of an injection-moulding means and the fundamental sequence of method steps of the production method, FIGS. 2A–C show, by way of example, three toothbrushes produced with the aid of the apparatus and the method explained in connection with FIGS. 1A–D.

DETAILED DESCRIPTION

FIG. 1A shows a cross-section through an injection mould of the injection moulding means comprising an upper mould component 9 and a first lower mould component 10a which are in contact with one another at a mould parting plane 11. The two mould halves 9 and 10a define a first mould cavity 4 having inserted therein e.g. two movable mandrels 6a, 6b, as shown in FIG. 1A. The movable mandrels are accommodated in openings of the first lower mould component 10a. As can be seen in FIG. 1B, the two movable mandrels 6a, 6b can be moved essentially at right angles to the mould parting plane 11. Passage openings 12a, 12b are formed in the movable mandrels 6a, 6b. These passage openings 12a, 12b are of such a nature that they permit a first component of synthetic resin preferably the hard component a to pass during the injection moulding process. Furthermore, means , such as knives or cutting edges, are provided at these passage openings 12a, 12b for cutting through bridge portions 7a, 7b formed due to these passage openings 12a, 12b, as will be explained hereinbelow.

As can be seen in FIGS. 1C and 1D, the injection moulding means comprises a second lower mould component 10b defining together with the upper mould component 9 a second mould cavity 5 which is larger than the first mould cavity 4.

In the following, the mode of operation of the injection moulding means will be explained in detail. First of all, the bristle bundles are inserted in the injection mould, which, as can be seen in FIG. 1A, comprises the upper mould component 9, the first lower mould component 10a and the movable mandrels 6a and 6b. When the bristle bundles 3 have been inserted into the upper mould component 9, the ends of said bristle bundles are encompassed with the first component of synthetic resin which is preferably the hard component a by injection moulding. In the course of this process, bristle-bundle holding sections 8a, 8b, 8c are formed, which are interconnected by bridge portions 7a, 7b. The bridge portions 7a, 7b are formed due to the fact that the hard component a fills the openings 12a, 12b in the movable mandrels 6a, 6b during the injection moulding process. When the basic toothbrush body consisting of hard component a and comprising the bristle-bundle holding sections 8a, 8b, 8c has been produced in this way, the bridge portions 7a, 7b formed between said bristle-bundle holding sections 8a, 8b, 8c are cut off. This is done by drawing the movable mandrels 6a, 6b out through the openings in the first lower mould component 10a essentially at right angles to the mould parting plane 11. Subsequently, a connection consisting of the hard component a no longer exists between the bristle-bundle holding sections 8a, 8b and 8c. In this production phase at the latest, the bristle bundles 3 are fixed in the upper mould component 9 by clamping them in position by means of a holding device (not shown). Following this, the first lower mould component 10a is replaced by the second lower mould component 10b, as can be seen in FIG. 1C. The upper mould component 9 and the second lower mould component 10b form together a second mould cavity 5 which is larger than the first mould cavity 4. Following this, the bristle-bundle holding sections 8a, 8b and 8c, which have been injection-moulded from the hard component a and then separated from one another, are encompassed with a second component of synthetic resin, preferably a rubber-like soft component b by injection moulding. When this production process has been finished, the toothbrush can be removed from the mould. The material used as a soft component is preferably a thermoplastic elastomer having a hardness of less than 90 Shore A.

It follows that the toothbrush produced in this way comprises bristle bundles which are enclosed by the hard component a, the bristle-bundle holding sections which consist of said hard component being supported completely in said soft component b so that the respective bristle bundle is movably held in the brush head according to the elastic properties of the soft-elastic component. FIG. 1B shows individual bristle bundles 3 around which bristle-bundle holding sections 8a, 8c are formed, and groups of bristle bundles on which a common bristle-bundle holding section 8b is formed.

Attentively, both said first and second components can be comprised of hard components of synthetic resin of different elasticity and/or rigidity.

The method of producing a toothbrush with improved elastic properties aims at injection-moulding first a basic body of a brush head 2 from said hard component a, the individual bristle bundles 3 being received in said basic body and bristle-bundle holding sections 8a, 8b, 8c being formed of said hard component, said bristle-bundle holding sections being only connected to the rest of the basic body by one or by a plurality of bridge portions 7a, 7b, so as to produce the whole basic body of the brush head in one working process. These bridge portions 7a, 7b are subsequently cut through so that the individual bristle-bundle holding sections 8a, 8b, 8c will no longer be connected. For this purpose, it is necessary to make sure that the individual bristle bundles 3 are fixed at the predetermined position. Subsequently, the bristle-bundle holding sections and the rest of the brush head are encompassed fully or partly with a soft component b by means of injection moulding so as to reestablish a connection between the previously separated components. When the basic body of the brush head is being produced, said basic body can be produced separately or in combination with the handle 1 in one working process. When the brush head is being encompassed with the soft component fully or partly, also the handle can be encompassed fully or partly with said soft component in a corresponding manner.

The above-mentioned method refers preferably to the production of a toothbrush in anchorless technology, in the case of which the bristle bundles are provided, e.g. by partial melting, with an enlarged portion at one end thereof, whereupon they are embedded in the hard component. To the person skilled in the art it will, however, be obvious that, as a modification of the present method and of the present apparatus, said method and apparatus can also be used for a toothbrush produced in anchor technology, i.e. a bristle bundle is wound in a U-shape around an anchor, i.e. a lamina consisting of metal or plastic material, and stamped into blind holes, after the formation of these blind holes by injection-moulding the brush head from said hard component. For this purpose, it is only necessary to provide holding devices which fix the respective bristle-bundle holding sections having the blind holes provided therein, when the bridge portions have been cut through. If necessary, additional holding devices have to be provided, which permit the bristle bundles with the anchor to be stamped into the bristle-bundle holding sections embedded in the soft component. In some cases, it will be expedient to combine the anchorless technology with the anchor technology for producing a toothbrush.

FIGS. 2A to 2C show three examples of toothbrushes which have been produced with the aid of the above-mentioned method and the injection-moulding means. FIG. 2a shows a brush head 2 and a handle 1. The brush head 2 is provided with a plurality of bristle bundles 3 embedded in the hard component a. In a central area of the brush head 2, a plurality of bristle bundles 3 is embedded in a section consisting of said hard component a. In a front and in a rear area of the brush head 2, a respective single bristle bundle is arranged, which is embedded in a respective bristle-bundle holding section consisting of said hard component a. This bristle-bundle holding section is, in turn, embedded in the soft component b so as to achieve a higher elasticity. For producing the basic body of this toothbrush, the movable mandrels are implemented such that they are provided with openings so that the bristle-bundle holding sections of the bristle bundles 3 in the front and in the rear area of the brush head 2 can be injection-moulded in one injection-moulding process together with the central area of said brush head 2. As a result, one or a plurality of bridge portions are formed between the bristle-bundle holding sections consisting of the hard component a of the front and of the rear head area and the central brush area. These bridge portions are cut through by removing the movable mandrels. The mould cavity formed as a result of the removal of the mandrels and/or an additional mould cavity formed as a result of changing part of the mould or as a result of the removal of additional mandrels is then filled with the soft component b in accordance with a two-component injection moulding process. In this connection, it can be seen that the shape, the position and the number of movable mandrels is selected in accordance with the desired geometry and the bristle pattern of the brush head.

FIG. 2B shows a further example of a toothbrush which has been produced with the aid of the above-mentioned method and the injection-moulding means. The individual bristle bundles are embedded separately or in groups in the hard component a similar to the bristle bundles shown in FIG. 2A. Individual bristle bundles are embedded in sections consisting of the soft component b. These soft-component sections alternate with hardcomponent sections. The number and the structural design of the mandrels required for the production are chosen in accordance with the geometry and the desired properties of the bristle pattern of the brush head in a manner similar to that described in connection with FIG. 2A.

FIG. 2C shows a further embodiment of a toothbrush which has been produced with the aid of the above-mentioned method and the injection-moulding means. In the case of the toothbrush according to FIG. 2C, a plurality of bristle bundles are embedded in the hard component a in a central brush area. In lateral areas on the right- and on the left-hand side, individual bristle bundles are provided with bristle-bundle holding sections consisting of the hard component a and embedded in a section consisting of the soft component b. Also in the case of the toothbrush according to FIG. 2C, the position, the shape and the number of mandrels depend on the desired geometry and the desired properties of the brush head.

In the examples shown in FIGS. 2A to 2C, individual bristle bundles are enclosed by the hard component a so as to form a bristle-bundle holding section. These bristle-bundle holding sections are enclosed by the soft component b so as to improve the elastic properties. It is, however, obvious to the person skilled in the art that it will also be possible to form a group of bristle bundles having a common bristle-bundle holding section which, in turn, can be embedded in a soft component in accordance with the above-mentioned method. Furthermore, it can be seen in connection with these embodiments, in particular in connection with the toothbrushes according to FIGS. 2A and 2C, that bristle bundles of the central area of the brush head 2 can also be inserted by means of the anchor technique, without major problems arising.

What is claimed is:

1. An injection-moulding means for producing a toothbrush, comprising an upper mould component and a first lower mould component defining together a first mould cavity for injection moulding a basic body of a brush head, wherein at least one movable mandrel is provided in said first mould cavity, said mandrel comprising first means causing the formation of at least one bridge portion between injection-moulded bristle-bundle holding sections during the injection-moulding process, and that the mandrel comprises second means which will cut off the bridge portion when said mandrel is moved in a predetermined manner.

2. An injection-moulding means according to claim 1, wherein the first means are provided for forming a plurality of bridge portions.

3. An injection-moulding means according to claim 1, wherein a plurality of movable mandrels are provided.

4. An injection-moulding means according to claim 1, wherein the upper mould component is provided with openings for accommodating the individual bristle bundles of the brush head during the injection-moulding process.

5. An injection-moulding means according to claim 1, wherein at least one mandrel is movable substantially at right angles to the longitudinal direction of the at least one bridge portion.

6. An injection-moulding means according to claim 1, wherein a second lower mould component is provided, which defines together with the upper mould component a second mould cavity that is larger than said first mould cavity.

7. An injection-moulding means according to claim 1, wherein a holding device is provided for holding the bristle bundles during the injection-moulding process in the upper mould component.

8. An injection-moulding means according to claim 1, wherein the injection-moulding means comprises means for injection moulding the basic body of the brush head from a first component and means for encompassing the basic body with a second component by injection moulding.

9. An injection-moulding means according to claim 8, wherein the first component is a hard component and the second component is a soft component.

10. An injection-moulding means according to claim 8, wherein the first and second components are both hard components of different rigidity and/or elasticity.

* * * * *